(12) United States Patent
Ashihara et al.

(10) Patent No.: US 6,518,916 B1
(45) Date of Patent: Feb. 11, 2003

(54) OBJECT RECOGNITION APPARATUS

(75) Inventors: Jun Ashihara, Wako (JP); Takashi Sugawara, Wako (JP); Hiroshi Kudoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/691,073

(22) Filed: Oct. 19, 2000

(30) Foreign Application Priority Data

Oct. 19, 1999 (JP) .......................................... 11-297474

(51) Int. Cl.⁷ .............................................. G01S 13/93
(52) U.S. Cl. ............................. 342/70; 342/90; 342/99; 342/133; 342/139; 342/146; 342/196
(58) Field of Search ............................... 342/70, 71, 72, 342/90, 98, 99, 133, 135, 139, 145, 146, 157, 158, 192, 194, 196

(56) References Cited

U.S. PATENT DOCUMENTS

| | | | |
|---|---|---|---|
| 5,247,307 A | * 9/1993 | Gandar et al. | 342/192 |
| 5,424,823 A | 6/1995 | Nettles et al. | 356/5.01 |
| 5,574,463 A | * 11/1996 | Shirai et al. | 342/70 |
| 5,751,240 A | 5/1998 | Fujita et al. | 342/70 |
| 5,959,571 A | 9/1999 | Aoyagi et al. | 342/70 |
| 6,249,243 B1 | * 6/2001 | Takagi | 342/70 |
| 6,292,737 B1 | * 9/2001 | Higashimata et al. | 701/96 |
| 6,356,229 B1 | * 3/2002 | Schneider | 342/70 |

FOREIGN PATENT DOCUMENTS

| | | |
|---|---|---|
| DE | 198 50 128 | 5/1999 |
| EP | 0 773 452 | 5/1997 |
| EP | 0 806 681 | 11/1997 |
| EP | 0 936 474 | 8/1999 |
| JP | B2-2567332 | 10/1996 |
| JP | A-10-283462 | 10/1998 |

* cited by examiner

*Primary Examiner*—John B. Sotomayor
(74) *Attorney, Agent, or Firm*—Arent Fox Kintner Plotkin & Kahn, PLLC (57) ABSTRACT

This invention relates to an object recognition apparatus. This apparatus comprises an antenna which emits transmission beams toward a plurality of directions; a receiving circuit which receives reflected signals of the transmission beams from predetermined directions; a distance and direction calculation circuit which calculates distance and direction to objects reflecting the transmission beams based on the transmission beams and the reflected signals; an object pattern storage unit which stores range direction patterns of reflected signals obtained in advance with respect to predetermined objects; an object recognition circuit which compares range direction patterns of the reflected signals received by the receiving circuit with respect to the predetermined directions, with the range direction patterns stored in the object pattern storage unit, and which recognize that a pair of reflected signals from two neighboring directions are signals reflected by the same object.

8 Claims, 7 Drawing Sheets

OBJECT RECOGNITION APPARATUS

BACKGROUND OF THE INVENTION

1. Field of the Invention

This invention relates to an object recognition apparatus that can be used in an automatic driving controller suitable for cruising on a highway, for example. In particular, the present invention relates to an improvement of a technique for recognizing two or more vehicles driving ahead.

2. Description of Related Art

Conventionally, autopilot apparatuses are used in various ships for automatically steering the ships. Such autopilot apparatuses are mainly used when ships cruise on the open sea, and when the weather is bad or when running in difficult locations such as inside harbors; the ships are steered by navigators.

Similarly, automatic driving apparatuses for vehicles are now being studyied as is disclosed in Japanese Patent Application, First Publication, No. Hei 10-283462. However, because the conditions of roads varies due to the environment, and the number of vehicles running on the roads, there are many difficulties in developing an automatic driving apparatus for vehicles in comparison to the autopilot apparatuses for ships.

However, it is difficult for ordinary drivers to maintain concentration when driving vehicles on long and monotonous roads such as highways, and it is well known that such monotonous conditions may easily cause snoozing during driving. Therefore, in the case such as long-distance drive on a highway, the load on the driver can be decreased if vehicles can be driven by automatic driving apparatuses in areas, excluding, entrances and exits on highways.

In addition, when an automatic driving apparatus includes a navigation system using GPS (Global Positioning System) geodetic satellites, it is possible to store a driving route in advance in the automatic driving apparatus. In this case, because the automatic driving apparatus stores the driving route in advance, by continuously locating the present position using the navigation system, it becomes possible to drive the vehicle to the goal if conditions are suitable.

Moreover, in the areas where the vehicle density is high in comparison to the vehicle capacity of the roads, such as in Japan, it is easy to find a preceding vehicle running ahead of the subject vehicle. Therefore, as another type of automatic driving apparatus, an automatic driving apparatus for automatically following such a preceding vehicle is also studied. In this case, if a suitable preceding vehicle can be found, it becomes possible to perform automatic driving without complicated calculation in consideration of other vehicles.

As a device for detecting preceding vehicles or obstacles which can be used in those automatic driving apparatuses, a timesharing type FM radar system using millimeter band waves and a send and receive antenna is proposed in Japanese Patent No. 2,567,332. This FM radar system receives reflected waves reflected by a preceding vehicle or an obstacle, measures the distance between the present vehicle and the detected target based on differential time between the transmission and the reception of signal, and calculates relative speed with respect to the present vehicle based on the Doppler shift of the reflected signal. Furthermore, in this system, by providing a plurality of antennas for emitting a plurality of beams having the same radiation pattern toward a plurality of directions, it is possible to detect the direction to the preceding vehicle or the obstacle.

In general, behaviors of vehicles such as maximum speeds and decelerating characteristics when braking are various due to the kinds of vehicles, for example, trucks or passenger cars. Therefore, it is desirable when performing automatic driving to detect the kinds of vehicles ahead. However, the above-mentioned radar system can detect only a vehicular gap, a relative speed, and direction to the preceding vehicle, and there is a problem that it cannot recognize the kind of detected vehicle.

In addition, when two or more preceding vehicles are running side by side, the conventional radar system recognizes these vehicles as one large vehicle.

Furthermore, when the subject, or present vehicle is running on a center lane and two preceding vehicles are running respectively on right and left lanes, if the distance to the preceding vehicles is large, although the center lane is empty, the radar system sometimes recognizes that one vehicle is running ahead. Therefore, although the present vehicle can pass by the preceding vehicles while running the center lane, the present vehicle would be controlled to follow the preceding vehicles with a constant vehicle gap, and there is a problem that this behavior would interfere the subsequent vehicles and inhibit smoothness of the traffic.

SUMMARY OF THE INVENTION

The first object of the present invention is to provide an object recognition apparatus that can distinguish the kinds of the preceding vehicles or obstacles.

The second object of the present invention is to provide an object recognition apparatus which can determine, when two or more vehicles are running side by side ahead of the present vehicles, that these are different kind of vehicles.

The third object of the present invention is to provide an object recognition apparatus which can determine, when two vehicles are running respectively on right lane and left lane ahead of the present vehicles, that the center lane is empty.

The first aspect of the present invention is an object recognition apparatus which comprises an antenna which emits transmission beams toward a plurality of directions; a receiving circuit which receives reflected signals of the transmission beams from predetermined directions; a distance and direction calculation circuit which calculates distance and direction to objects reflecting the transmission beams based on the transmission beams and the reflected signals; an object pattern storage unit which stores range direction patterns of reflected signals obtained in advance with respect to predetermined objects; an object recognition circuit which compares range direction patterns of the reflected signals received by the receiving circuit with respect to the predetermined directions, with the range direction patterns stored in the object pattern storage unit, and which recognize that a pair of reflected signals from two neighboring directions are signals reflected by the same object.

In this object recognition apparatus, the object pattern storage unit stores range direction patterns of reflected signals which are obtained in advance with respect to objects having various shapes. These objects may be rear portions of predetermined vehicles, and in this case, it is possible to determine the kinds of preceding vehicles using the stored range direction patterns. The range direction patterns may be determined based on the length of each of the predetermined vehicles, that is, the length of the range direction patterns may be the values corresponding to the standard length of the vehicles to be registered. In this case, it is possible to reduce the data amount to be stored in the object pattern storage unit while enabling the determination of the kind of vehicles.

The transmission beam is preferably FM waves in the range of 60 to 77 GHz. By using FM waves, the distance to objects can be calculated based on time difference between the transmission and reception of the FM waves, and furthermore, relative speed of the object can be determined based on the Doppler shift of the reflected waves.

The pluralities of transmission beams are preferably emitted in an angular range of 10 to 20 degrees with respect to the forward direction of the antenna. In this case, sufficient information can be obtained in order to drive a vehicle on a highway automatically. Several of the transmission beams are preferably three to nine. If the number of transmission beams is two, it is difficult to obtain a resolving power sufficient for automatic driving of vehicles. The transmission beams may be pulse radar or laser radar.

The object recognition circuit recognizes that two reflected waves that come from neighboring directions and have the same range directional pattern are reflected by the same object. Therefore, such as when a truck and a passenger car are running side by side, if reflected waves, which come from neighboring directions, have range directional patterns different from each other, the object recognition circuit can determine that two different vehicles are running side by side.

In the case where the object recognition circuit is constructed so as to recognize each object in consideration of the normal widths of various vehicles which are registered in advance in the object pattern storing unit and the like, even if, for example, two sedan type cars are running side by side, the object recognition circuit can determine that two sedan type cars are running side by side.

The object recognition apparatus according to the second aspect of the present invention comprises an antenna which emits transmission beams toward a plurality of directions; a receiving circuit which receives reflected signals of the transmission beams from predetermined directions; a distance and direction calculation circuit which calculates distance and direction to objects reflecting the transmission beams based on the transmission beams and the reflected signals; a frequency computing circuit which calculates frequency spectrums of the reflected signals from predetermined directions; a clustering processing circuit which compares with each other the frequency spectrums of the reflected signals obtained with respect to the predetermined directions, and which recognizes that reflected signals having similar frequency spectrums are signals reflected by the same object.

In this case, if a similar section is found in the frequency spectrums corresponding to two neighboring reflected signals, the clustering processing circuit performs clustering of the two signals as the signals reflected by the same object. In this way, the clustering processing circuit compares reflection spectrums of all neighboring directions, and performs clustering of signals that are determined to be reflected by the same object. Thus, this object recognition apparatus can recognize that two vehicle are running ahead of the present vehicle even when two different types of vehicles are running side by side ahead of the present vehicle.

DETAILED DESCRIPTION OF THE INVENTION

Hereinafter, the preferred embodiments of the present invention will be explained referring to the figures.

Figure 1:
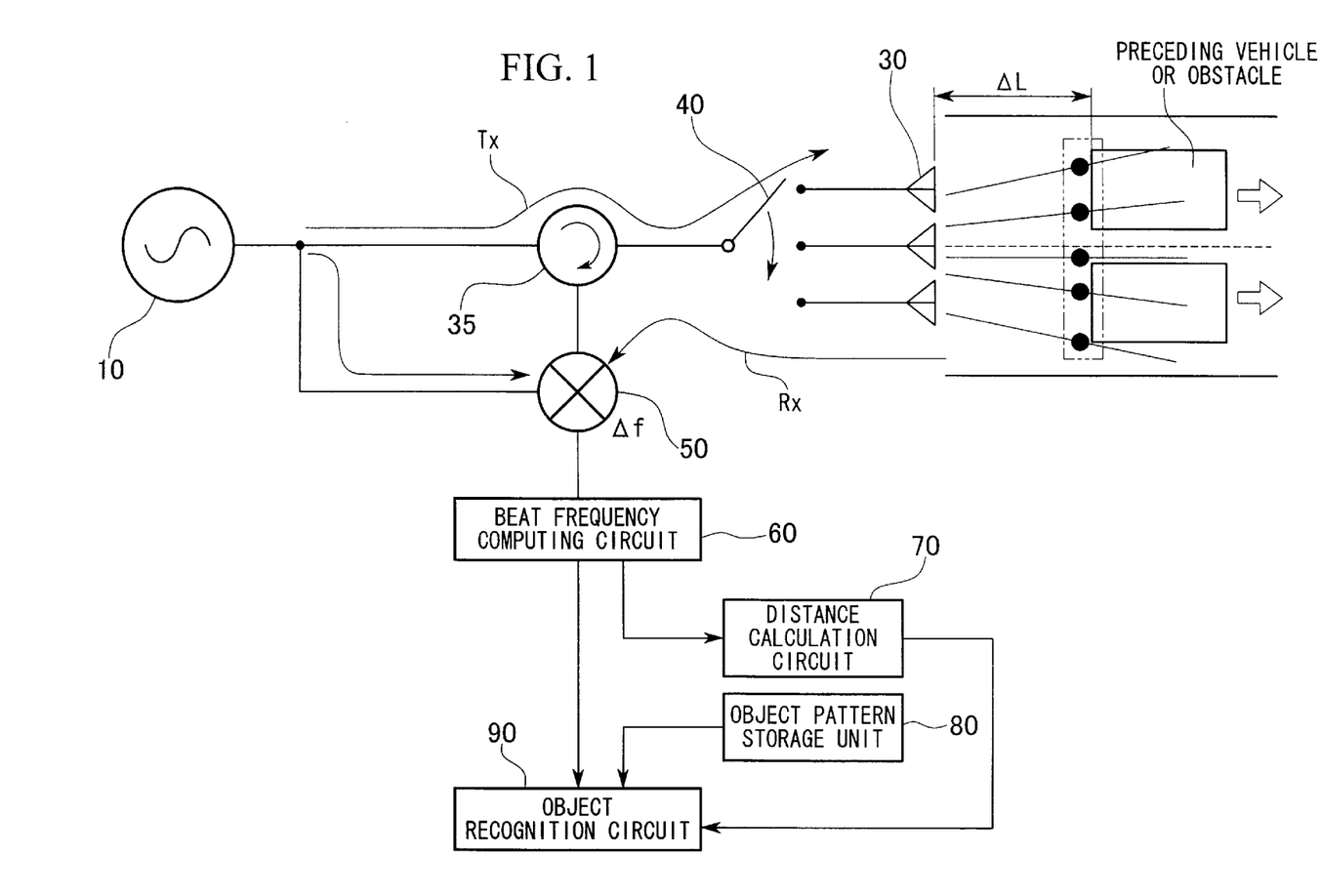
FIG. 1 is a block diagram illustrating an object recognition apparatus according to the first embodiment of the present invention.

FIG. 1 is a block diagram illustrating the first embodiment of the present invention. In FIG. 1, a FM wave generating circuit 10 generates FM waves having a frequency of about 77 GHz in the millimeter wave band. By using millimeter wave, it is possible to set a maximum measurable distance to several hundred meters when searching a target such as a preceding vehicle or an opposing car, and to prevent the emitted wave from propagating more than need be to the distance, due to a large propagation attenuation factor of this wave band.

The FM waves Tx generated by the FM wave generating circuit 10 is transmitted to an antenna 30 via a circulator 35 and an antenna switching unit 40. The antenna 30 may be an offset defocus parabolic multi-beam antenna which comprises a common parabolic reflecting mirror and a plurality of (for example, four) primary active elements arranged at the vicinity of the focal point of the reflecting mirror so that the primary active elements face the reflecting mirror at angles being different from each other. The antenna switching unit 40 supplies the amplified FM waves to one of the primary active elements while switching the primary active elements by turns. Thus, the antenna 30 emits transmission beams toward a plurality of directions in a scanning manner.

A mixer 50 is connected to the circulator 35 to receive reflected waves Rx reflected by objects such as preceding vehicles, opposing vehicles, protective walls, and obstacles, and functions as a receiving circuit. Also, the mixer 50 mixes a part of the FM waves generated by the FM wave generating circuit 10 and the received reflected waves, and outputs beat signals. The beat signals output by the mixer 50 are input to a beat frequency computing circuit 60, and is subjected to analog-digital conversion. The beat frequency computing circuit 60 comprises a fast Fourier transform (FFT) circuit (not shown), and this FFT circuit converts the digital signal to a frequency spectrum and further calculates a beat frequency. Based on the beat frequency calculated by the beat frequency computing circuit 60, a distance calculation circuit 70 calculates the propagation delay time of the FM waves, and determines the distance ΔL between the antenna 30 and the object reflecting the FM waves.

An object pattern storage unit 80 is provided to store range direction patterns of reflected signals which are obtained in advance with respect to objects having various shapes. The range directional pattern of a reflected signal is a frequency spectrum obtained by emitting FM waves toward an object from the antenna 30, receiving the reflected FM waves by the antenna 30, and converting the received signal to the frequency spectrum by the mixer 50 and the beat frequency computing circuit 60. The object to be registered may include preceding vehicles, opposing vehicles, trucks, buses, motorcycles, bicycles, pedestrians, structures in side strips, structures in medial strips, accesses and exits of tunnels, and branching strips in interchanges.

The object pattern storage unit 80 is connected to an object recognition circuit 90, which is connected to the beat frequency computing circuit 60. This object recognition circuit 90 compares a range direction pattern obtained from each reflected signal received by the mixer 50 with respect to each of the transmit directions, with range direction patterns stored in the object pattern storage unit 80, and determines what object reflected each FM wave. Furthermore, the object recognition circuit 90 compares the objects assumed with respect to the neighboring transmit directions, and determine if the FM waves were reflected by the same object. Thus, the object recognition circuit recognizes that two reflected waves that come from neighboring directions and have the same range directional pattern are reflected by the same object.

Figure 2:
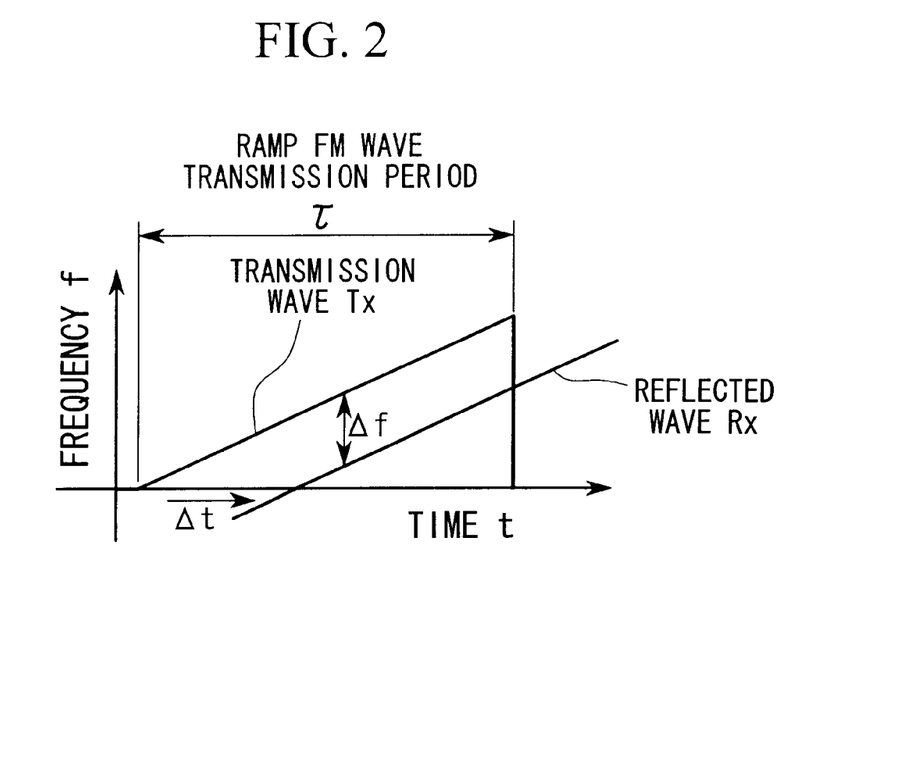
FIG. 2 is a graph illustrating the relationship between transmission FM waves emitted from an antenna and reflected waves reflected by an object.

Next, the operation of the above apparatus will be explained. FIG. 2 is a graph illustrating FM waves emitted from the antenna 30 and reflected waves reflected by an object. The FM waves transmitted from the antenna 30 are ramp waves in which the frequency "f" is monotonously increased during one cycle τ and the output intensity is constant during one transmit cycle. The waves reflected by an object are received when a delay time Δt has passed from the transmittance of the FM waves, and this delay time Δt is proportional to the distance from the antenna 30 to the object. The frequency of the reflected waves is shifted by a frequency Δf from that of the transmission waves which are transmitted at that moment, and this differential frequency Δf is proportional to the delay time. Therefore, in a period in which the reflected waves and the transmitted wave are superimposed, a beat signal having a frequency Δf is generated.

Figure 3:
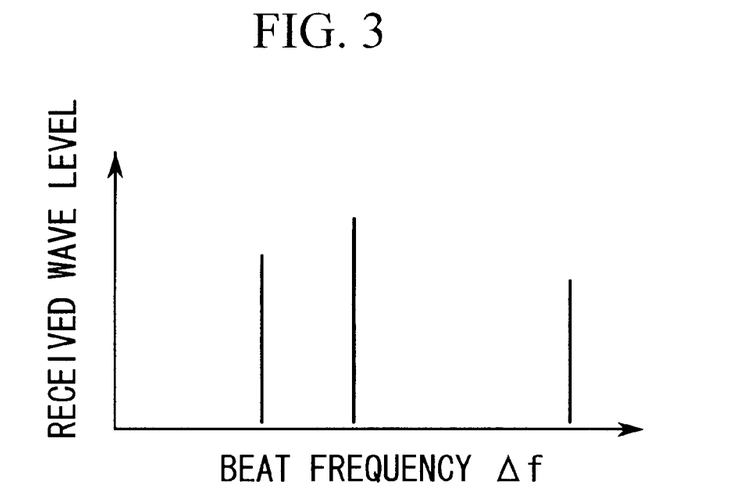
FIG. 3 is a graph illustrating the result analyzed by a beat frequency computing circuit.

FIG. 3 illustrates an example of the frequency analysis performed by the beat frequency computing circuit 60. As shown in this figure, the beat frequency computing circuit 60 detects peaks of the received wave level with respect to beat frequency. The beat frequency Δf corresponds to the distance from the antenna 30 to the object. The received wave level corresponds to the strength of the reflected waves, and depends on the shape and the reflection factor of the reflecting object.

Figure 4:
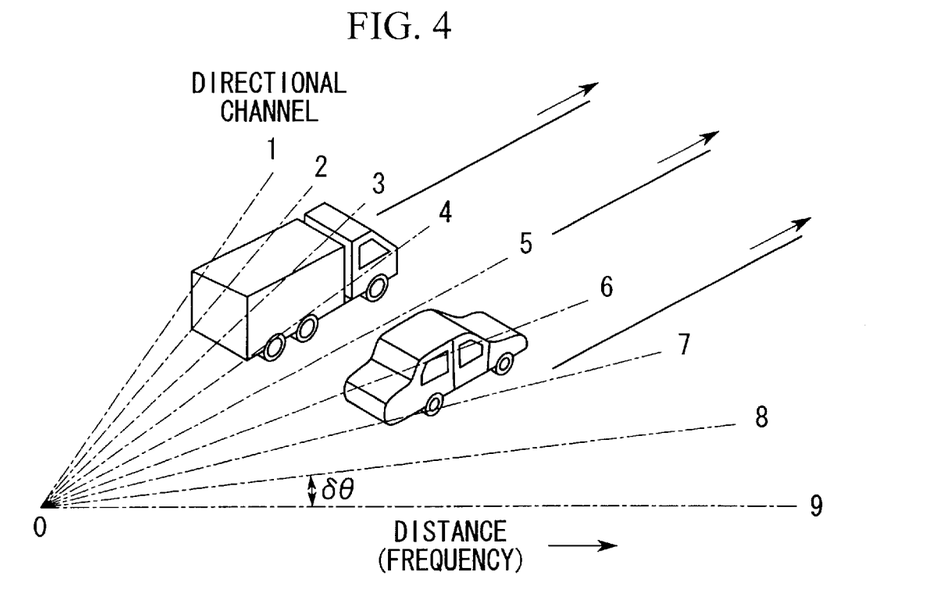
FIG. 4 is a perspective view illustrating the case where a truck and a passenger car are running side by side ahead of the present vehicle.

FIG. 4 illustrates a case where a truck and a passenger car are running as preceding vehicles. The antenna 30 is placed at point "O", and the antenna 30 emits forward nine transmission beams along directional channels 1 to 9 in an angular range of 10 to 20 degrees with respect to the forward direction of the antenna 30. Preferably, the angle δ θ between two neighboring beams are 2 to 5 degrees. In this figure, the vehicle provided with this object recognition apparatus is running along the center directional channel 5. Although it is easy for the driver of this vehicle to recognize that a truck and a passenger car are running while adjoining to each other, the object recognition apparatus recognizes this condition by the following process.

Figure 5:
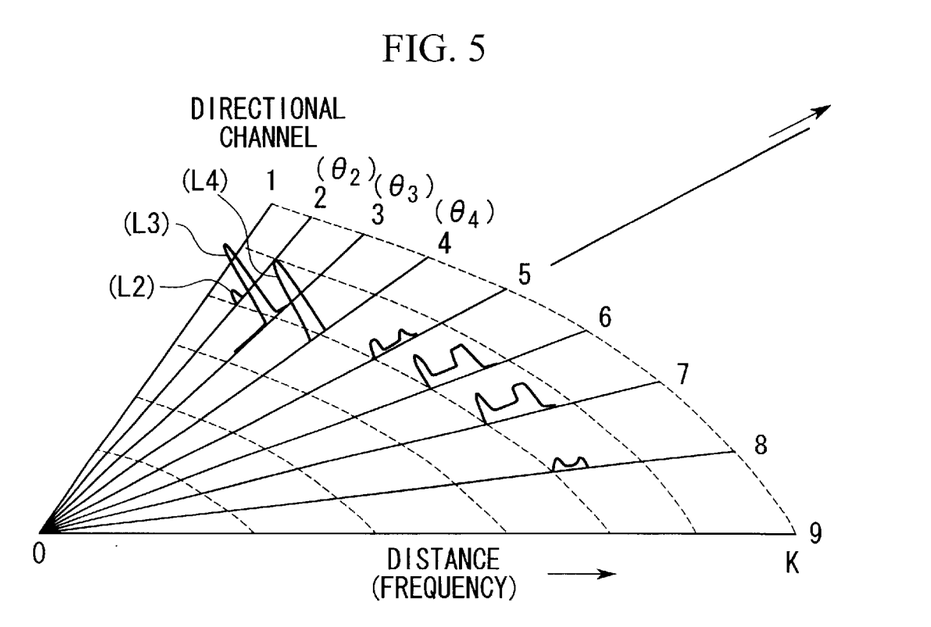
FIG. 5 is a graph illustrating range direction patterns that can be obtained in the case shown in FIG. 4.

FIG. 5 illustrates range direction patterns obtained with respect to the directional channels 1 to 9 in the condition shown in FIG. 4. The reflected signals from the directional channels 3 and 4 are the signals reflected by the truck, and the reflected signals from the directional channels 2 and 5 are due to side lobes of the antenna 30. Furthermore, the reflected signals from the directional channels 6 and 7 are the signals reflected by the passenger car, and the reflected signals from the directional channels 5 and 8 are due to side lobes of the antenna 30.

The distance calculation circuit 70 calculates weighted average angle Θ by averaging the directional angles weighed by the levels of the reflected waves, and outputs the angle Θ as the direction of the detected object. For example, the distance calculation circuit 70 calculates the directional angle of the truck using the directional angles $\theta_2$, $\theta_3$, and $\theta_4$, and the levels L2, L3, and L4 of the reflected waves obtained with respect to the directional angles $\theta_2$, $\theta_3$, and $\theta_4$, in accordance with the following formula:

$$\Theta = (L2 \cdot \theta_2 + L3 \cdot \theta_3 + L4 \cdot \theta_4)/(L2 + L3 + L4) \tag{1}$$

Figure 6A:
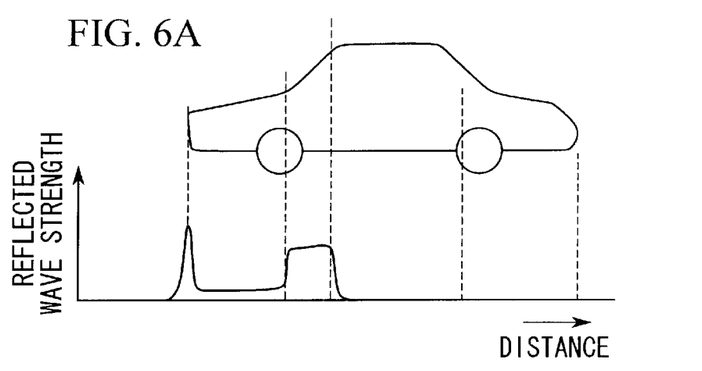
FIG. 6A is an illustration showing a range directional pattern corresponding to a passenger car.
Figure 6B:
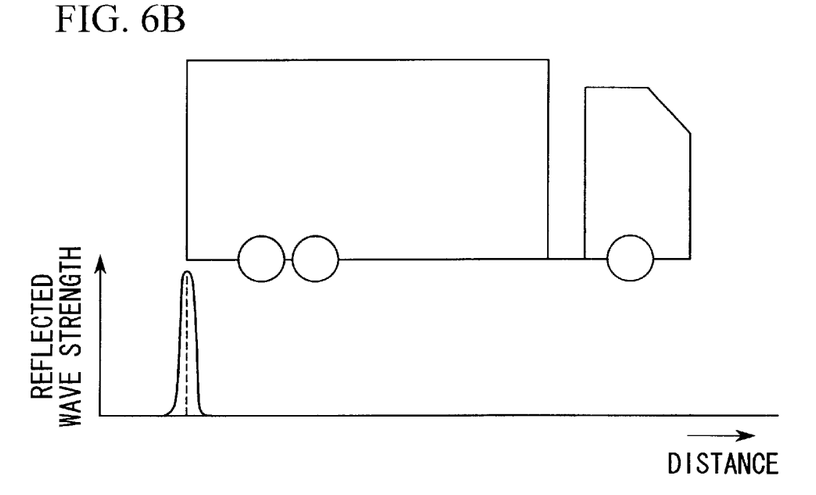
FIG. 6B is an illustration showing a range directional pattern corresponding to a truck.

FIGS. 6A and 6B respectively illustrate the range directional patterns of the reflected waves of a truck and a passenger car. Because the passenger car shown in FIG. 6A has a sedan type shape (three box shape), the FM waves are reflected by the rear end face, where a rear license plate is fixed, and the rear window, when the passenger car is running ahead of the present vehicle. The reflected waves reflected by the rear end face of the passenger car appears in the range directional pattern as a high narrow peak, and the reflected waves reflected by the rear window appears as a low flat peak due to the inclination of the rear window. In contrast, because the truck has a large upright wall as an entrance to the cargo space at the rear end thereof, as shown in FIG. 6B, the reflected waves reflected by the rear wall appears as a single high and narrow peak.

Figure 7:
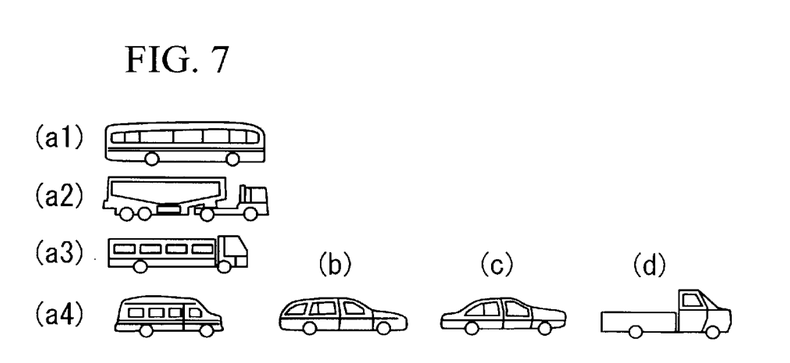
FIG. 7 is an illustration showing various types of vehicles.

FIG. 7 illustrates variations of preceding vehicles. When a bus (a1), a trailer (a2), a truck (a3), or a van (a4) is running ahead, a range directional pattern having a single narrow peak is obtained. With respect to a van (b) having a sloped rear end, a range directional pattern having a single, but broad peak is obtained. With respect to a three box style passenger car (c) and a truck (d) without a cover over its bed, a range directional pattern having two peaks is obtained. These range directional patterns are stored in advance in the object pattern storage unit 80.

The object recognition circuit 90 compares each of the range directional patterns of the directional channels 1 to 9 shown in FIG. 5 with the various range directional patterns stored in the object pattern storage unit 80, and determines that a truck and a passenger car are running ahead side by side.

The above first embodiment comprises an object pattern storage unit 80 for storing frequency spectrum patterns of reflected signals as range directional patterns obtained in advance with respect to various types of vehicles. In contrast, the next second embodiment does not use such an object pattern storage unit 80.

Second Embodiment

Figure 8:
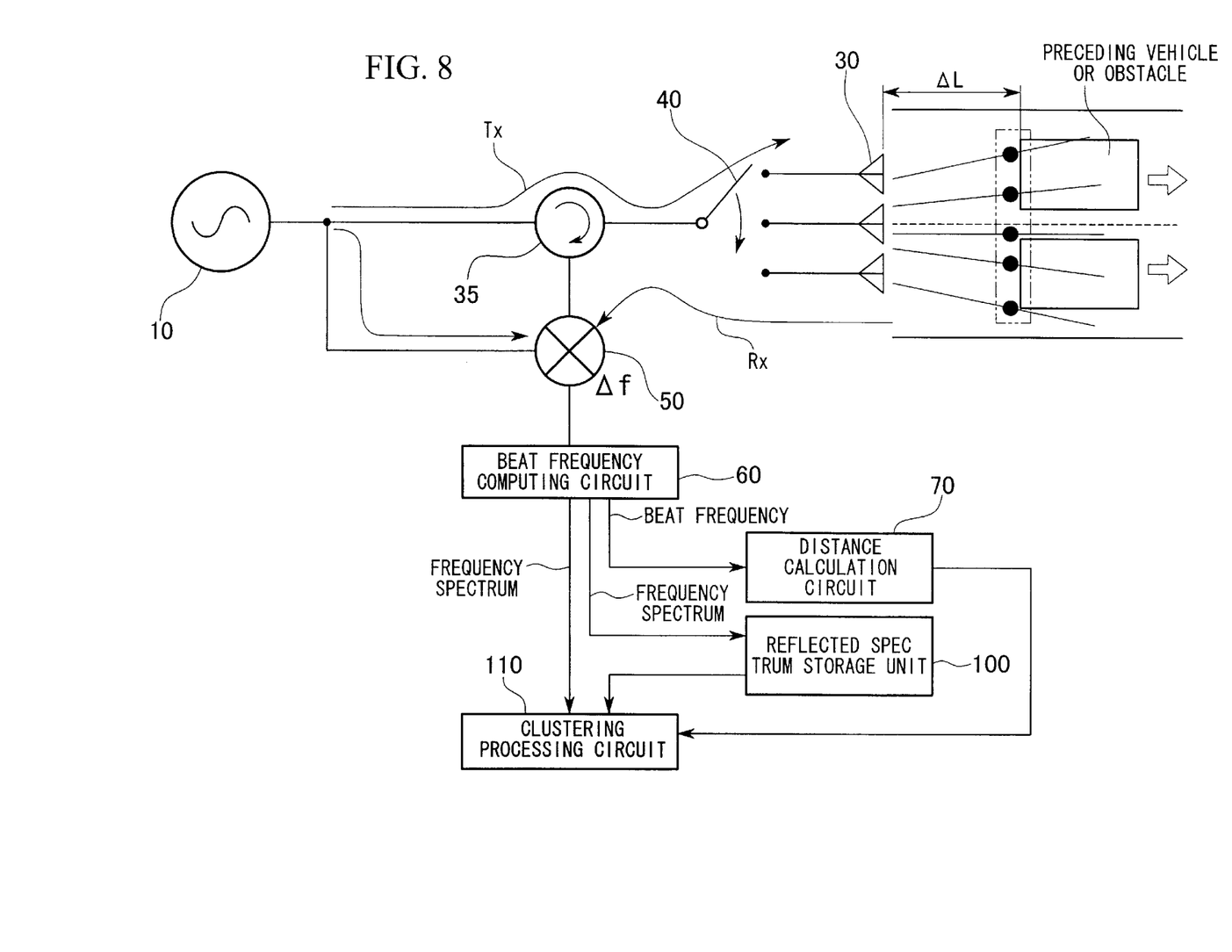
FIG. 8 is a block diagram illustrating an object recognition apparatus according to the second embodiment of the present invention.

FIG. 8 is a block diagram illustrating a second embodiment of the present invention. In FIG. 8, elements having the same functions as those shown in FIG. 1 are attached with the same reference numbers, and explanation thereof will be omitted.

In this embodiment, a reflected spectrum storage unit 100 is connected to the beat frequency computing circuit 60, so as to store the frequency spectrum obtained by the beat frequency computing circuit 60 with respect to each of the directional channels 1 to 9. A clustering processing circuit 110 is connected to both the beat frequencies computing circuit 60 and the reflected spectrum storage unit 100. This clustering processing circuit 110 compares the frequency spectrums of the neighboring directional channels transmitted from beat frequency computing circuit 60 and the reflected spectrum storage unit 100, and determines that the two reflected signals were generated by the same object if the two frequency spectrums have the patterns similar to each other. In this embodiment, the reflected spectrum storage unit 100 functions as a buffer for absorbing the difference between the processing rates of the beat frequency computing circuit 60 and the reflected spectrum storage unit 100. However, if such a problem does not occur, the reflected spectrum storage unit 100 can be omitted.

The operation of this apparatus will now be explained. In the case where a vehicle provided with this object recognition apparatus is running as shown in FIG. 4, this apparatus detects frequency spectrums of beat signals such as shown in FIG. 5 in a polar coordinate, as well as the first embodiment.

Figure 9A:
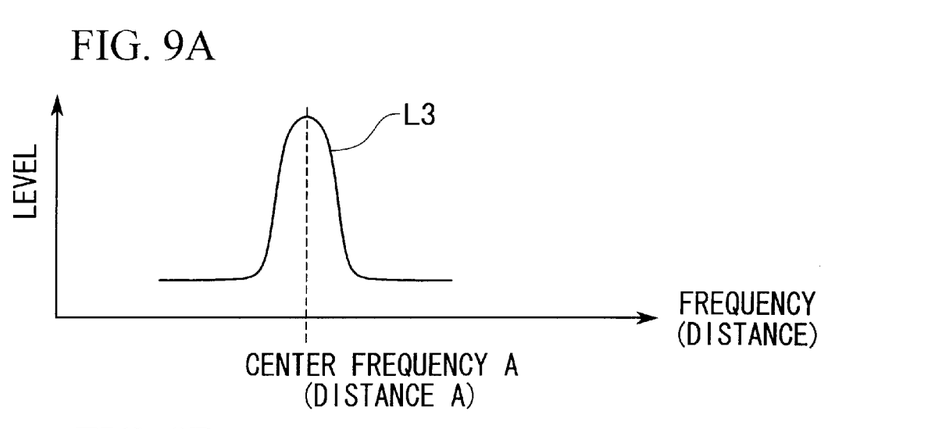
FIG. 9A is a graph showing an example of reflection spectrum stored in a reflected spectrum storage unit in the second embodiment.

Next, in this second embodiment, a section of the frequency spectrum corresponding to one of the directional channels 1 to 9 is extracted from the frequency spectrum as a reflection spectrum of a single object, and the reflection spectrum is stored in the reflected spectrum storage unit 100. FIG. 9A illustrates an example of the reflection spectrum L3 extracted from the frequency spectrum corresponding to the directional channel 3.

Next, the clustering processing circuit 110 determines whether the frequency spectrum corresponding to the subsequent directional channel contains a section which has a shape similar to that of the stored section and which appears in the similar frequency band. This frequency band has a width corresponding to the entire length of the detected vehicle. For example, FIG. 9B illustrates reflection spectrum L4 extracted from the frequency spectrum corresponding to the directional channel 4, and in this case, the determination will be "YES."

Figure 9B:
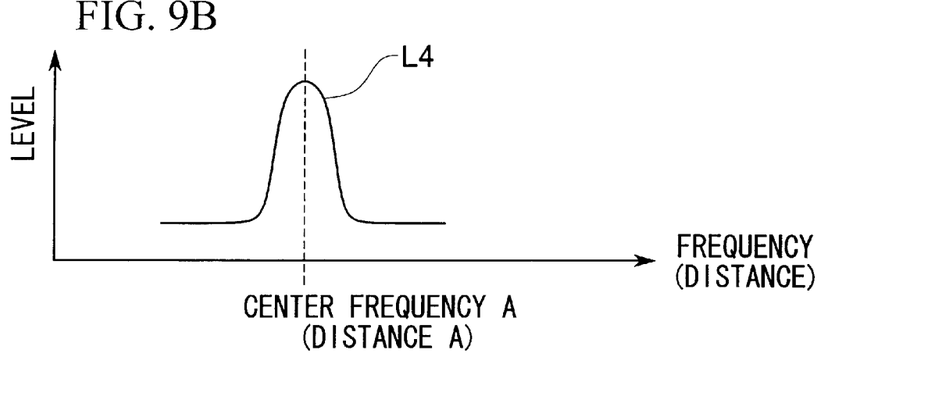
FIG. 9B is a graph showing an example of a section of a frequency spectrum corresponding to the reflection spectrum shown in FIG. 9A.

If a similar section is found, as shown in FIG. 9B, in the frequency spectrum corresponding to the subsequent directional channel, the clustering processing circuit 110 performs clustering of the two frequency spectrums as the signals reflected by the same object. This clustering is a process for associating a plurality of signals, which was reflected by the same object, with each other.

Figure 9C:
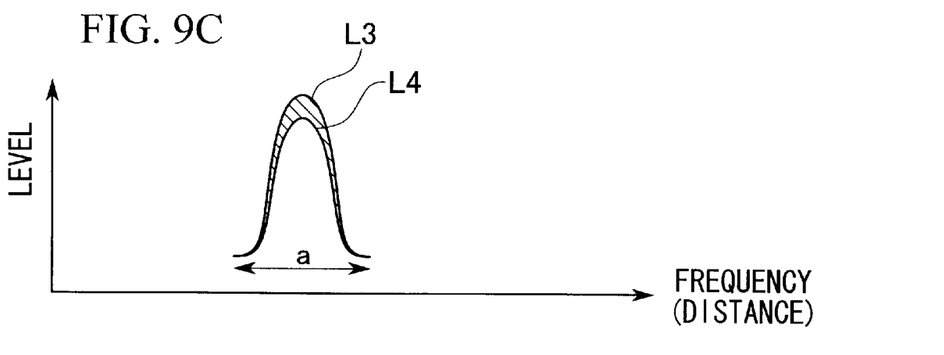
FIG. 9C is a graph showing a method for comparing the spectrums shown in FIGS. 9A and 9B.

In the case where the two similar reflection spectrums (for example, L3 and L4) do not completely coincide, as shown in FIG. 9C, the clustering processing circuit 110 calculates the differential area between two reflection spectrums, and, if the differential area is smaller than a predetermined threshold, the clustering processing circuit 110 determines that the two reflection spectrums are derived from the same object and performs the above clustering of the two signals.

Figure 10:
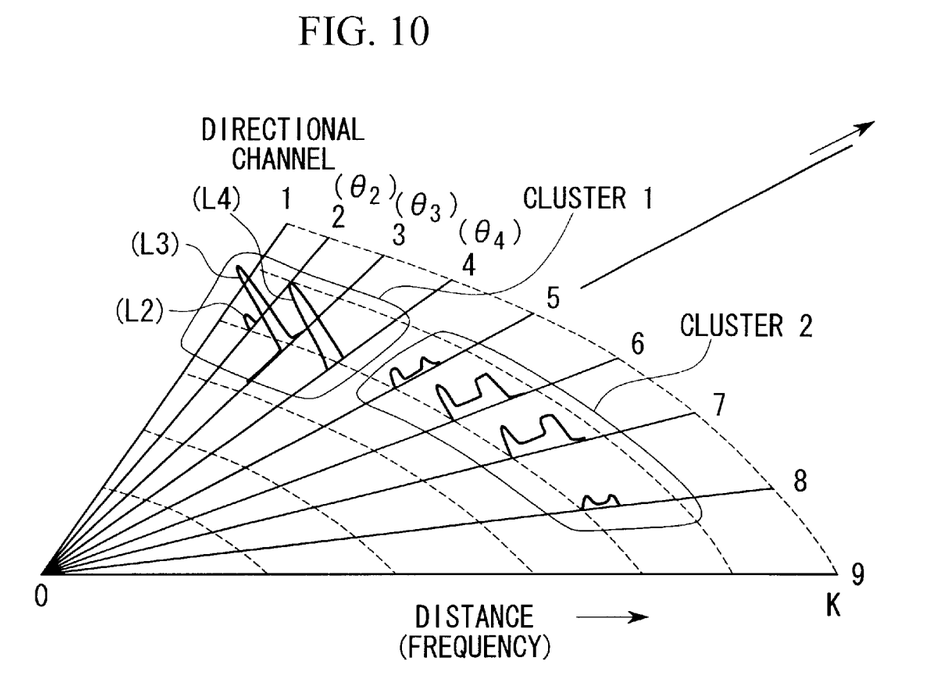
FIG. 10 is a graph illustrating the clustering process by the second embodiment in the case shown in FIG. 4.

In this way, the clustering processing circuit 110 compares reflection spectrums of all neighboring directional channels in whole possible frequency ranges, and performs clustering of signals which are determined to be reflected by the same object. FIG. 10 illustrates the case where the reflection spectrums L2 to L4 are classified as cluster 1, and the reflection spectrums L5 to L8 are classified as cluster 2. Thus, this object recognition apparatus recognizes that two vehicle are running ahead of the present vehicle.

With respect to each of the clusters 1 and 2, the distance calculation circuit 70 calculates the direction and the width of each detected object. Thus, the positions of the objects can be located in a two-dimensional radar map.

Although the cluster 2 corresponds to four directional channels 5 to 8, the clustering processing circuit 110 may exclude the spectrums of both side's directional channels 5 and 8 as being generated by side lobes of the antenna 30 in consideration of the width of vehicles.

In addition, by calculating the Doppler shift of the reflected waves, it is easy to measure the velocity of the object corresponding to each cluster and to determine whether the object is static or not.

Moreover, a navigation system or apparatus may be additionally provided in the vehicle comprising this object recognition apparatus. In this case, the prospective running route of the vehicle can be presumed based on velocity and yawing rate of the present vehicle. Therefore, by superimposing the prospective running route and the two-dimensional mapping of the detected object, it is possible to actualize a vehicle follow-up control system or a radar braking system.

In the second embodiment, because the clustering processing circuit 110 can classify reflected signals for each detected object without using frequency spectrum patterns stored in advance, it is not necessary to measure in advance the frequency spectrum patterns of reflected signals with respect to various types of vehicles, and furthermore, it is possible to precisely recognize novel objects.

Other Modifications

In the first embodiment, the object recognition circuit 90 recognizes the preceding vehicles only by comparing the range direction patterns of the reflected signals reflected by the vehicles from with the range direction patterns stored in the object pattern storage unit 80. However, the present invention is not limited to this construction, but the object recognition circuit 90 may additionally determine the size of each detected vehicle and recognize the spatial relationship between the present vehicle and the preceding vehicle. In this case, for example, when the present vehicle is running on the center lane and two preceding vehicles are running respectively on the right lane and the left lane, the object recognition circuit 90 can recognize that the two preceding vehicles are not running on the center lane based on the sizes of the preceding vehicles. Thus, the present vehicle can outstrip the preceding vehicles while running on the center lane, or the present vehicle can transfer to the right or left lane in order to allow the subsequent vehicles to pass. Therefore, the smoothness of the traffic can be improved.

Furthermore, in the present invention, pulse radar or laser radar may be used as the transmission beams instead of FM millimeter waves used in the embodiments, in order to obtain the same effects.

What is claimed is:

1. An object recognition apparatus comprising:
   an antenna that emits transmission beams toward a plurality of directions;
   a receiving circuit that receives reflected signals of the transmission beams from predetermined directions;
   a distance and direction calculation circuit which transforms the reflected signals to range direction patterns composed of beat frequencies between the transmission beams and the reflected signals and signal intensities at each beat frequency and calculates distance and direction to objects reflecting the transmission beams based on the range direction patterns;

an object pattern storage unit which stores range direction patterns of reflected signals obtained in advance with respect to predetermined objects;

an object recognition circuit which compares range direction patterns of the reflected signals received by the receiving circuit with respect to the predetermined directions, with the range direction patterns stored in the object pattern storage unit, and which recognize that a pair of reflected signals from two neighboring directions are signals reflected by the same object.

2. An object recognition apparatus according to claim 1, wherein the object pattern storage unit stores range direction patterns of reflected signals obtained in advance with respect to rear portions of predetermined vehicles.

3. An object recognition apparatus according to claim 1, wherein the object pattern storage unit stores range direction patterns of reflected signals obtained in advance with respect to predetermined vehicles, and the range direction patterns are determined based on the length of each of the predetermined vehicles.

4. An object recognition apparatus according to claim 1, wherein the object recognition circuit determines the direction to a detected object by calculating the position of center of gravity based on the range direction patterns which are recognized as those generated by the same object.

5. An object recognition apparatus according to claim 1, wherein the object recognition circuit recognizes that a pair of reflected signals from two neighboring directions are signals reflected by the same object using size of vehicles as references.

6. An object recognition apparatus according to claim 5, wherein the object recognition circuit recognizes that two or more of the same kind of vehicles exist side by side, in the case where range direction patterns of a pair of reflected signals respectively obtained with respect to two neighboring directions are the same, and when a detected size is larger than a vehicle's size stored in advance.

7. An object recognition apparatus according to claim 1, further comprising a FM wave generating circuit which generates ramp waves in which frequency is increased during one cycle, wherein the antenna emits the ramp waves as the transmission beams.

8. An object recognition apparatus comprising:

antenna that emits transmission beams toward a plurality of directions;

receiving circuit that receives reflected signals of the transmission beams from predetermined directions;

distance and direction calculation circuit which calculates distance and direction to objects reflecting the transmission beams based on the transmission beams and the reflected signals;

frequency computing circuit this calculates frequency spectrums of the reflected signals from predetermined directions;

clustering processing circuit which compares with each other the frequency spectrums of the reflected signals obtained with respect to the predetermined directions, and which recognizes that reflected signals having similar frequency spectrums are signals reflected by the same object.

* * * * *